July 3, 1956  C. S. DRAPER  2,752,790
GYROSCOPIC APPARATUS
Filed Aug. 2, 1951  2 Sheets-Sheet 1

INVENTOR,
CHARLES S. DRAPER
BY
ATTORNEYS

July 3, 1956 C. S. DRAPER 2,752,790
GYROSCOPIC APPARATUS
Filed Aug. 2, 1951 2 Sheets—Sheet 2

INVENTOR.
CHARLES S. DRAPER
BY
ATTORNEYS

United States Patent Office 2,752,790
Patented July 3, 1956

2,752,790

GYROSCOPIC APPARATUS

Charles S. Draper, Newton, Mass., assignor, by mesne assignments, to Research Corporation, New York, N. Y., a corporation of New York Application August 2, 1951, Serial No. 239,978

3 Claims. (Cl. 74—5.4)

The present invention relates to gyroscopic apparatus and more particularly to means for adapting a gyroscope to move in a way which is a desired function of an input motion.

In measuring angular motion through the use of gyroscopes, sometimes the velocity of the motion is measured, sometimes the acceleration or the displacement. It has generally been found necessary to make extensive changes in the construction of the gyro itself to do this. For example, a gyro with spring restraint of gyro rotation (used for measuring velocity) would have to be converted to a damping restraint (for measuring deflection). This virtually requires that separate gyros be used for each measurement.

Therefore, it is one object of the present invention to provide gyroscopic apparatus permitting one gyroscope to measure different functions of the input motion. A further object of the present invention is to provide apparatus which can be constructed as a standard gyro unit readily adaptable to measure these different functions by changing only components external to the unit.

In furtherance of these and other objects as will hereinafter appear, one of the features of the present invention is the use of a single-degree-of-freedom gyroscope. As will be shown below, using such a gyro permits the isolation of motion about one axis and also allows the gyro to be mounted in a single cylindrical housing, with axial bearings.

Another feature of the invention is the coupling to the single-degree-of-freedom gyro of a torque generator and signal generator to provide restraint for the gyro precession. By using the microsyn components described in U. S. Patent No. 2,488,734 issued to Mueller November 22, 1949, they may be made of a size and shape that will fit conveniently with the gyro into one cylindrical housing.

The principal feature of the present invention is the provision of a coupling network to feed back the output from the signal generator (proportional to the gyro deflection, if the components of the above-mentioned patent are used) to the input of the torque generator. This causes a torque to be exerted restraining the gyro deflection which may be made any desired function of that deflection by using appropriate coupling networks. In this way, the net gyro output motion can be made to be a desired function of the input motion. The output can be sensitive to acceleration, velocity, or displacement.

Figure 1:
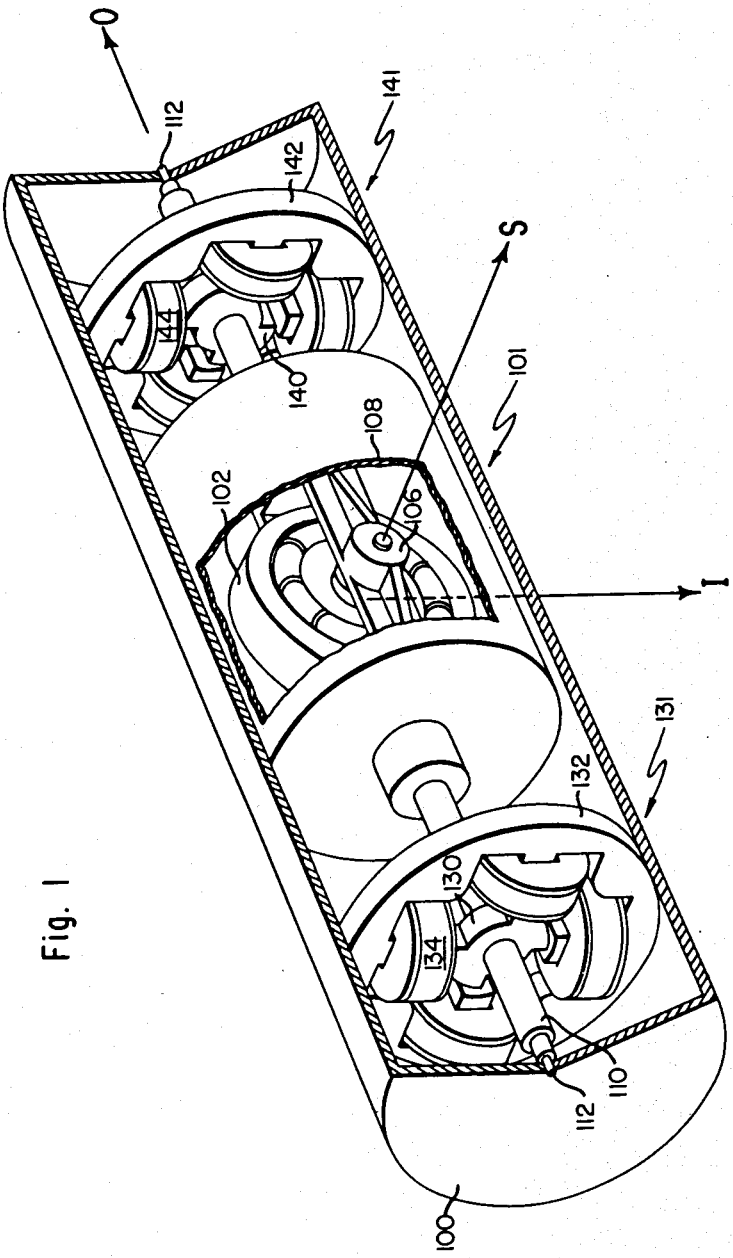
Figure 2:
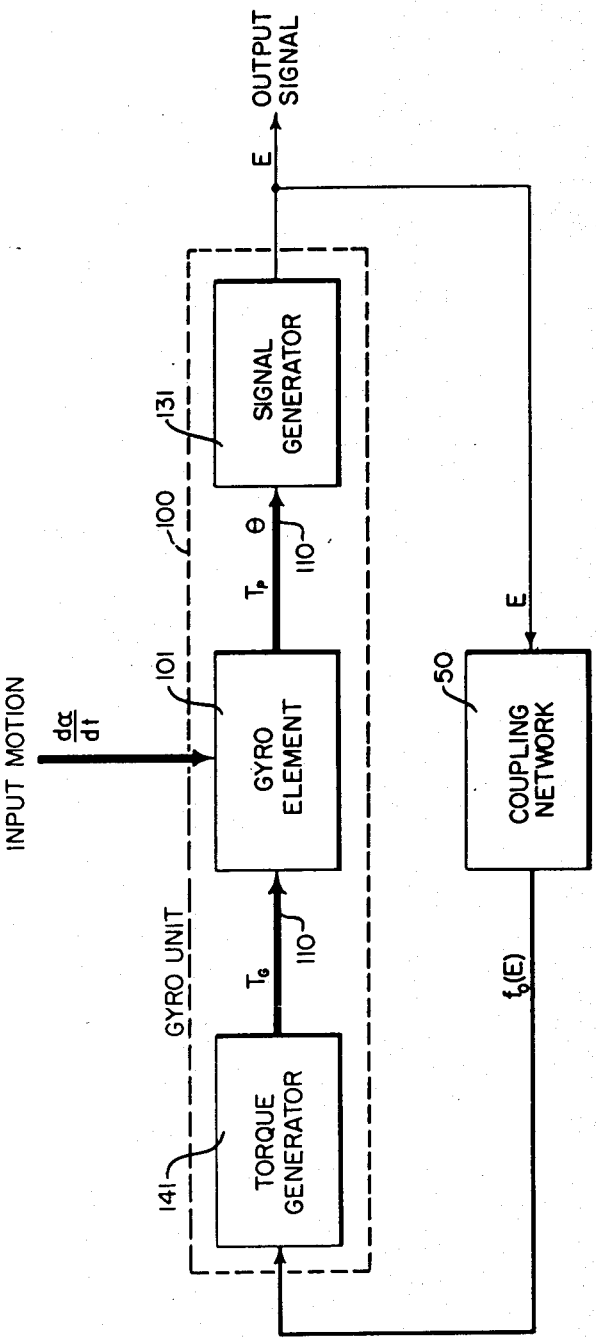
Figure 3:
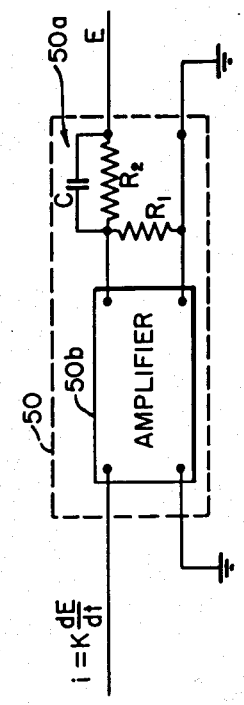

In the accompanying drawings which show a preferred embodiment of the invention, Fig. 1 is a schematic diagram of one of the preferred gyro units; Fig. 2 is a block diagram showing the interrelation of the mechanical and electrical components in the complete feedback system; Fig. 3 is a detail.

In Fig. 1, a single-degree-of-freedom gyroscope is shown. To say that the gyro has only one degree of freedom means that it is free to precess about only one axis. In Fig. 1, this axis is defined by the bearings 112 in the case 100. Rotatable in the bearings is the shaft 110 carrying the rotor mount 106. The rotor 102 is held so it is free to spin in its bearings driven as a synchronous motor. It can be seen therefore, that the rotor and frame can rotate only about the axis denoted by the vector O, called the output axis. It can also be seen that the gyro will be sensitive to motion only about one axis. According the well-known gyro theory, if it is attempted to twist a gyro about one axis, the gyro tends to turn about an axis perpendicular to the spin axis and the first axis. Here, the gyro and frame can turn only about the output axis O, and therefore the only axis about which motion of the case causes turning about O is the input axis I, perpendicular to the spin axis S and the output axis O. Thus, if the case 100 is rotated about the spin axis S, no force causes the gyro to precess. If the case is rotated about the output axis O (and some means provided to keep the gyro from just standing still), the gyro rotor 102 will exert a torque against its bearings, the couple lying in the plane of the frame 106, so that no motion takes place. If, on the other hand, the case is rotated about the input axis I (perpendicular to the output and spin axes) a torque $T_0$ will be generated about the output axis O. This torque will be equal to the product of the angular momentum H of the rotor and the rate of change of the angular position $\alpha$ about the input axis.

(1) $$T_0 = H \frac{d\alpha}{dt}$$

Thus, by providing means to measure the output torque, the single-degree-of-freedom gyro can be used to measure angular motion about the input axis.

A way to measure the output torque is to oppose it by a variable, measurable torque, and note the point at which equilibrium is reached. Ordinarily, this is done by putting a spring restraint about the output axis; the equilibrium deflection angle is then proportional to the input angular velocity, as in a conventional turn indicator for aircraft. In the copending applications No. 209,461 of Bentley and Draper and No. 216,946 of Draper, Woodbury and Hutzenlaub, the torque is opposed by a viscous damping torque and the equilibrium position is reached when the precession angular velocity is proportional to the input angular velocity, that is, when the output deflection is proportional to the input deflection.

The present invention provides the resisting torque through the use of a torque generator as shown at 141 in Fig. 1. The gyro element is fixed to the shaft 110 which can rotate in the bearings 112. Also coupled to that shaft is the rotor 140 of the torque generator. The only essential property of the torque generator is that it can produce a torque between its rotor and its stator 142 (attached to the case 100) which is a known function of an electrical input to its windings 144. In the preferred embodiment of our invention, a torque generator like that disclosed in the above-mentioned Mueller patent is used and the torque is proportional to the current input. This is the torque that restrains the gyro.

At the other end of the unit shown in Fig. 1 a signal generator 131 like that in Mueller's patent is provided with its rotor 130 attached to the shaft 110 and stator 132 to the case 100. With a fixed reference voltage applied to its windings 134, such a signal generator produces an output voltage proportional to the deflection of its rotor with respect to its stator, thus measuring the deflection of the gyro element 101.

It is to be understood that the apparatus and method of the present invention are not to be limited to the use of components like those shown in Fig. 1. Any means which will provide an electrically variable torque about the gyro element shaft or any means that gives an electrical output dependent on that shaft position may be used.

Means by which the signal generator output is fed back to the torque generator to make the output a desired function of the input will now be shown by reference to Fig. 2. The components of Fig. 1 are there shown as blocks; the connections between them are indicated by heavy lines if they are rigid mechanical connections, medium lines for power level connections and light lines for signal level connections. The coupling from the signal generator to the torque generator passes through a coupling network 50. Generally this network may include a pre-amplifier to raise the signal to a more manageable power level. The network may also include means for transferring the modulation in the modulated signal from the signal generator to another carrier frequency or to direct current. A current generator may be used to provide a suitable input to the torque generator. These circuits are ordinary types which will be familiar to one skilled in the art and are therefore not described in detail. A conventional function-generating network is provided in the coupling network 50 to generate a function $f_0$ of the signal generator output voltage E which will determine the relation between gyro output motion and input motion. This relation will appear from the summation of torques about the shaft 110. (It will be assumed that friction and inertial torques are held to such small values as to be negligible.) The torque generator torque $T_g$ will restrain the output torque $T_o$. The torque generator torque will be equal to its sensitivity $S_2$ times the input current $f_0$ (E) from the coupling network 50. The output voltage E of the signal generator will equal the signal generator sensitivity $S_1$ times the deflection $\theta$ of the shaft 110.

(2) $$E = S_1\theta$$

(3) $$T_g = S_2 f_0(E)$$

Therefore, (4) $$T_g = S_1 S_2 f(\theta)$$

where $S_1 f(\theta)$ is the same as $f_0(S_1\theta)$.

At equilibrium, with $T_o$ equal to $T_g$, Equation 1 can be substituted:

(5) $$H\frac{d\alpha}{dt} = S_1 S_2 f(\theta)$$

(6) $$f(\theta) = \frac{H}{S_1 S_2}\left(\frac{d\alpha}{dt}\right)$$

(7) $$\theta = f^{-1}\left[\frac{H}{S_1 S_2}\left(\frac{d\alpha}{dt}\right)\right]$$

where H, $S_1$ and $S_2$ are all constants, $$\left(\frac{d\alpha}{dt}\right)$$

the only variable, and the inverse function $f^{-1}$ is defined:

(8) $$\frac{f^{-1}[f(\theta)]}{\theta} = 1$$

In other words, the output deflection $\theta$ of the gyro will be a function of the input angular velocity. This function is the inverse of the coupling network function, except for corrections for system constants. The signal generator delivers an output voltage proportional to the output deflection $\theta$.

As an illustration, consider the case where the coupling network includes a differentiating circuit, so that:

(9) $$f_0(\theta) = K\frac{d\theta}{dt}$$

then,

(10) $$\theta = \frac{H}{S_1 S_2 K}\alpha$$

that is to say, an output voltage taken from the signal generator will be proportional to the deflection about the input axis, or the integral of the velocity or rate. The system is behaving just as if there were viscous damping about the gyro element; it is a rate-integrating gyro.

Another illustration is the case where the coupling network merely amplifies the signal generator output voltage E:

(11) $$f_0(\theta) = K\theta$$

(12) $$\theta = \frac{H}{S_1 S_2 K}\frac{d\alpha}{dt}$$

In other words, an output reading from the signal generator would be proportional to the input velocity; it is a rate gyro. An integrator in the coupling network would make the gyro acceleration-sensitive.

It now becomes simple to measure several quantities with one gyro detecting unit, by simply connecting the several coupling networks in parallel and switching the feedback link to the appropriate coupler for the desired function. It is to be understood that differentiation (which supplies equivalent damping) may be added to improve the transient response of any configuration of the coupler which causes an oscillatory gyro response.

Fig. 3 is a detail of the coupling network 50 for the case where it differentiates its voltage input E. An amplifier 50b is provided to generate a suitable input for the torque generator 141. The network shown generally at 50a acts as a non-ideal differentiator, differentiating high frequencies, that is functions with periods short compared to the time constant $R_2 C$. The network comprises a resistor $R_2$ in parallel with a condenser C both being connected in series with a resistor $R_1$. The output voltage of the network 60a is tapped off $R_1$ and under proper conditions is very nearly $$\frac{R_1 R_2 C}{R_1 + R_2}\left(\frac{dE}{dt}\right)$$

This voltage is amplified to match the torque generator impedance, producing a final output current $i$ from the coupling network 50 which is proportional to $$\frac{dE}{dt}$$

by a constant K determined by $R_1$, $R_2$, C, and the gain of the amplifier 50b. By this circuit the integrating gyro system of Equation 10 is obtained. By simply omitting the differentiating circuit, the rate gyro system of Equation 12 is obtained.

Referring to Fig. 1, it can be seen that the gyro element is encased in a float 108 as provided in the application of Jarosh, Haskell and Dunnell, Serial No. 210,246, filed February 9, 1951. The gyro case 100 is filled with a viscous fluid of a density such that it will exert a buoyant force on the float of such a magnitude as to substantially zero the static load on the bearings. The purpose of the float and fluid is therefore twofold: first, the fluid exerts a buoyant force on the float 108 which materially reduces the load on the bearings 112; second, the fluid, being viscous, resists rotations of the float and the gyro element, thereby providing damping. So far as the damping is concerned, its only effect on the system described in the present invention is to introduce a time delay. The gyro element will reach its equilibrium position by an exponential decay, and, once steady-state conditions have been reached, the above equations apply without change. The flotation is useful to reduce bearing friction and the damping is useful to smooth the output and to achieve stability. Without damping, certain forms of the system would have an oscillatory transient response, that is, in response to sudden changes in the precession torque (corresponding to sudden input angular velocity changes) the gyro would oscillate about its new steady-state position. The damping causes these oscillations to die out almost immediately.

It is to be understood, however, that the present invention is not limited to the gyro unit described in that application. The only requirements are that the gyro have one degree of freedom, that it be adaptable to means for detecting its deflections and to means for generating a torque tending to deflect it.

Having thus described my invention, I claim:

1. Gyroscopic apparatus comprising a gyro rotor, a frame member rotatably supporting the rotor, means for causing the rotor to spin in the frame, an outer member supporting the frame member to rotate with a single degree of freedom about an output axis perpendicular to the spin axis, a chamber carried by the frame member and having a small clearance with the outer member, a viscous floating and damping fluid between the chamber and the outer member, an electric signal generator comprising a rotor connected to the frame member and having stator windings to produce an output signal voltage proportional to the deflection of its rotor with respect to its stator, an electric network for generating from the signal voltage an electric input which is a desired function of the amount of gyro rotation, a torque generator active about the gyro output axis and including a rotor connected to the frame member and having stator windings, and connections from the stator windings of the signal generator through the electric network to the stator windings of the torque generator.

2. Apparatus as defined in claim 1 in which the network includes differentiating means whereby one component of the torque applied by the torque generator is proportional to the rate of change of the amount of output rotation.

3. Apparatus as defined in claim 1 in which the network comprises an amplifier whereby the torque applied by the torque generator is proportional to the output rotation.

References Cited in the file of this patent

UNITED STATES PATENTS

| | | |
|---|---|---|
| 1,456,744 | Tanner | May 29, 1923 |
| 1,558,720 | Thompson | Oct. 27, 1925 |
| 1,773,172 | Davis | Aug. 19, 1930 |
| 1,831,597 | Henderson | Nov. 10, 1931 |
| 1,900,709 | Henderson | Mar. 7, 1933 |
| 1,940,387 | Boykow | Dec. 19, 1933 |
| 2,109,283 | Boykow | Feb. 22, 1938 |
| 2,274,443 | Fischer | Feb. 24, 1942 |
| 2,488,734 | Mueller | Nov. 22, 1949 |
| 2,553,786 | Redemske | May 22, 1951 |
| 2,584,222 | O'Connor | Feb. 5, 1952 |
| 2,590,428 | Noxon | Mar. 25, 1952 |
| 2,592,417 | Hale | Apr. 8, 1952 |
| 2,595,268 | Kellogg | May 6, 1952 |
| 2,618,159 | Johnson et al. | Nov. 18, 1952 |